United States Patent
Sullivan et al.

(10) Patent No.: US 9,208,241 B2
(45) Date of Patent: Dec. 8, 2015

(54) USER INTERFACE TASK FLOW COMPONENT

(75) Inventors: Blake Sullivan, Redwood City, CA (US); Edward J. Farrell, Los Gatos, CA (US); Matthew Clifton Cooper, Centennial, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1265 days.

(21) Appl. No.: 12/044,687

(22) Filed: Mar. 7, 2008

(65) Prior Publication Data

US 2009/0228775 A1    Sep. 10, 2009

(51) Int. Cl.
G06F 3/048    (2013.01)
G06F 17/30    (2006.01)

(52) U.S. Cl.
CPC ............................ *G06F 17/30873* (2013.01)

(58) Field of Classification Search
USPC .......................................... 709/201, 209, 219
See application file for complete search history.

(56) References Cited

U.S. PATENT DOCUMENTS

| | | | |
|---|---|---|---|
| 5,524,241 A * | 6/1996 | Ghoneimy et al. ............ 707/676 |
| 7,165,243 B1 * | 1/2007 | Pelegri-Llopart et al. ..... 717/136 |
| 7,278,113 B1 | 10/2007 | Racine et al. |
| 7,487,201 B1 * | 2/2009 | Murray et al. ................. 709/201 |
| 7,788,341 B1 * | 8/2010 | Burns ............................ 709/219 |
| 2005/0033717 A1 * | 2/2005 | Ellis et al. ......................... 707/1 |
| 2005/0289156 A1 * | 12/2005 | Maryka et al. ................ 707/100 |
| 2006/0050865 A1 | 3/2006 | Kortum et al. |
| 2006/0095538 A1 * | 5/2006 | Rehman et al. ............... 709/217 |
| 2007/0100844 A1 * | 5/2007 | Buttner et al. ................ 707/100 |
| 2007/0118844 A1 * | 5/2007 | Huang et al. ................... 719/330 |
| 2007/0130293 A1 * | 6/2007 | Dong et al. .................... 709/219 |
| 2008/0052305 A1 * | 2/2008 | Ohno ............................ 707/101 |
| 2009/0198828 A1 * | 8/2009 | Sullivan et al. ............... 709/231 |

OTHER PUBLICATIONS

Raghu Srinivasan, "WTP Tutorials—JavaServer Faces Tools Tutorial," Jun. 18, 2007 available at http://eclipse.org/webtools/jsf/docs/tutorial/JSFTools_1_0_tutorial.html.*

"Portlet", www.wikipedia.orq.

* cited by examiner

*Primary Examiner* — Matthew Ell
(74) *Attorney, Agent, or Firm* — Miles & Stockbridge, P.C.

(57) ABSTRACT

A system generates a computer user interface by including a tag in an area of the user interface that corresponds to a task flow component. The task flow component includes a plurality of sub-pages and control flow for the sub-pages. The user interface receives the task flow component and displays a current task flow sub-page within the area of the user interface and enables the control flow.

19 Claims, 7 Drawing Sheets

USER INTERFACE TASK FLOW COMPONENT

FIELD OF THE INVENTION

One embodiment is directed generally to computers, and in particular to a user interface on a computer.

BACKGROUND INFORMATION

Many Internet web sites require a user to traverse a series of web pages in order to accomplish a task. The set of pages and the logic controlling the order in which pages are displayed and how information is passed between displayed pages is referred to as a "task flow". The set of logic that determines which page in the task flow to display next based on the current displayed page, requested action and application logic is referred to as "control flow rules" or "control flow". User interaction with a user interface component or control typically generates the requested action.

For example, a task flow for performing a "checkout" after selecting items to purchase may present a first page for entering a mailing address, a second page for entering payment information, and a third page for entering a billing address. Each subsequent page, for example, can be presented to a user after the user enters information in the preceding page and then clicks on the next button invoking the control flow rules that declare that a "next page" action on the "mailing address page" should result in the display of the "payment information" page, and that a "next page" action raised on the "payment information" page should result in the display of the "billing address" page.

Task flows may also parameterize their initial state and the state passed between sub-pages so that the same task flow definition may be reused in multiple contexts. For example, the above checkout example may take a "customer" as a parameter so that the correct customer data will be displayed and updated.

SUMMARY OF THE INVENTION

One embodiment is a system that generates a computer user interface by including a tag in an area of the user interface that corresponds to a task flow component. The task flow component includes a plurality of sub-pages and control flow for the sub-pages. The user interface receives the task flow component and displays a current task flow sub-page within the area of the user interface and enables the control flow.

DETAILED DESCRIPTION

One embodiment is a user interface that includes a region that is linked to a task flow component. The task flow component is a reusable task flow that can provide a variety of functionality.

Figure 1:
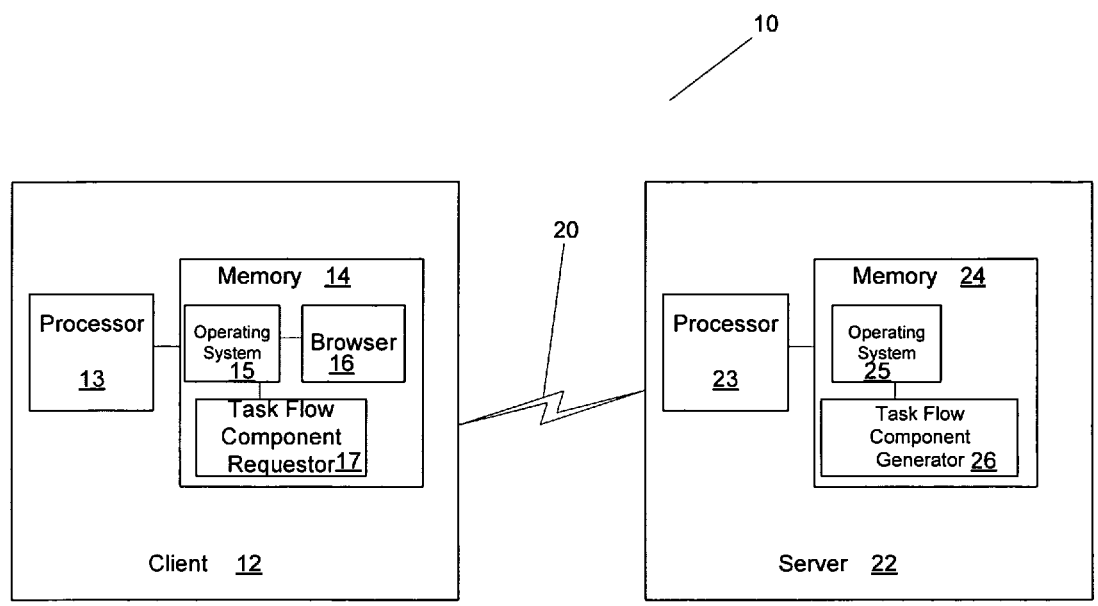
FIG. 1 is a block diagram of a system in accordance with one embodiment to provide a user interface with a task flow component.

FIG. 1 is a block diagram of a system 10 in accordance with one embodiment to provide a user interface with a task flow component. System 10 includes a client computer 12 that receives and displays a user interface ("UI") that includes links to one or more task flow components. Client computer 12 includes a processor 13 and memory 14. Processor 13 can be any type of specific or general purpose processor, and memory 14 can be any type of memory or other computer readable media that stores instructions that are executed by processor 14. Client 12 can be any type of computer or other computing device that can generate and display an Internet browser window or other type of graphical user interface ("GUI") or other type of UI, including a personal digital assistant ("PDA"), telephone, etc. In one embodiment, memory 14 includes an operating system 15, an Internet browser 16, and a task flow component requester 17.

Client 12 is coupled to a server computer 22 via a link 20. Link 20 is any type of local or network connection that enables client 12 to communicate and exchange data with server 22. In one embodiment, link 20 is the Internet. Server 22 includes a processor 23 and memory 24. Processor 23 can be any type of specific or general purpose processor, and memory 24 can be any type of memory or other computer readable media that stores instructions that are executed by processor 23. In one embodiment, memory 24 includes an operating system 25 and a task flow component generator 26.

In one embodiment, system 10 has a model-view-controller ("MVC") architecture. In general, MVC architectures separate data (the "model") and user interface (the "view") concerns, so that changes to the user interface will not affect data handling, and the data can be reorganized without changing the user interface. An intermediate component, the "controller", decouples data access and business logic from data presentation and user interaction.

In one embodiment, system 10 executes the Java Enterprise Edition ("Java EE") from Sun Microsystems, Inc. using the JavaServer Faces ("JSF") MVC framework. In this framework, the model is represented by Java beans, and the view is defined in a Java Server Page ("JSP"), using JSF components. The JSF framework acts as the controller. However, in other embodiments, any MVC framework may be used. Other embodiments can be implemented with other types of frameworks, such as web-based frameworks (e.g., Microsoft ASP-.NET, WebObjects, Apache Tapestry, Struts, etc.) or desktop frameworks (e.g., Microsoft Foundation Classes ("MFC") or Java Swing)

In one embodiment, a task flow component, also referred to as a "region", is a task flow that can be used in a web page as a sub-component of that page. In one embodiment, the web page is defined in a JSP page containing JSF components, one or more of which are task flow components. Multiple task flow components can be included in a single page, each being self-contained and nestable. A task flow component in one embodiment will have a single interface for setting attributes and behavior and may raise zero or more events as a result of some user or programmatic action acted upon the components in the currently displayed page of the task flow. An event in one embodiment can be a notification of a request to perform an action, or a notification that the action has occurred. The pages inside the task flow of a task flow component are referred to as "sub-pages". The task flow component may include one or more sub-pages. In the case of multiple sub-pages, the task flow component will define the navigation between those sub-pages using a control flow.

In one embodiment, one or more task flow components may be added to a JSP page. When a task flow component is included in a page, it is done so using a JSF task flow component tag. A task flow component drives the presentation and lifecycle of the task flow when it is being used as a sub-area on a page. In the simplest form, the task flow can contain a single sub-page containing a single component. In another embodiment, the task flow contains multiple individually viewable sub-pages each containing trees of user interface components. The user navigates between the sub-pages by interacting with the user interface components on each sub-page, which then fire the control flow rules to determine whether navigation should occur and which sub-page to navigate to.

A UI developer can build a task flow that can be inserted into a page as a region. For example, an "expense approval" task flow may include three sub-pages. These sub-pages can be used to create standalone pages, or as parts of other pages. The first sub-page may be a data-bound table that lists all of the expenses that are awaiting approval by a particular manager. The first sub-page includes a table of expense report information, a "Details" button and a "Budget" button. The task flow takes in a single parameter, a number corresponding to the user ID of the person logged into the system and viewing the "expense approval" sub-page.

Using a control flow rule, the developer can wire up the "Details" button to navigate to a "expense report details" sub-page, passing the expense report identifier. The "expense report details" sub-page includes a table displaying the passed in expense report's line items and "Overview" and "Budget" buttons. A control flow rule wires up "Overview" to return the user to the "expense approval" sub-page.

The developer can then use a control flow rule to wire up the "Budget" button to navigate to a "budget information" sub-page, showing the budget information for a given cost-center. The cost center is passed to this sub-page via a parameter that is taken from the cost center of the selected expense report on the "expense approval" page. Along with the budget table, the "budget approval" sub-page has a single button at the bottom of the table labeled "Back". The "Back" button will bring the user back to either the "expense report details" sub-page or the "expense approval" sub-page, whichever one brought them to the "budget approval" sub-page.

This task flow is now ready to be called from another page, or embedded as a region in another page. A UI developer, in one embodiment, using a visual editor, can see a list of all valid task flows that are currently part of the application they are working in that can be embedded as a region. For a task flow to be able to be used as region, in one embodiment, all of the pages contained in the task flow are JSF page fragments (i.e., JSF pages that do not include components and that are only allowed to appear once on a page). Using the visual editor, in one embodiment, a user can select a task flow that they want to embed as a region and drop it in the page.

In the JSP page, an <af:region> tag is created, while an associated <regionUsage> task flow reference is created in the JSP page's page definition file. If the task flow was not part of the application, it is added. The developer can then specify any of the task flow's parameters. The page is now ready to be run.

When a request is made for a page with a region in it, it is initially handled like any other JSF JSP page—the JSP tags in the JSP document are executed, creating the corresponding JSF components. When the region's <af:region> tag is executed, it creates a JSF region component, instantiates its associated task flow and asks the task flow for the location of the current sub-page JSF fragment to display. If this is the first time this task flow has been executed on this page, the task flow will initialize itself with its parameters and determine the location of the initial sub-page to display. The region tag then asks the JSP engine to include the JSF page fragment at the location returned by the task flow, and the JSP engine resumes executing this included content. If the included content itself contains region tags, this process continues for the contained region tags. When the JSP engine completes execution, a single JSF component tree with region components has been created and ready for execution of the JSF lifecycle For each phase of the JSF lifecycle, the region component ensures that the task flow's context is set up before executing the lifecycle on the JSF components for the current task flow sub-page included by the region and torn down when finished executing the lifecycle on those children. For example, before executing the render response phase on these children (when JSF components generate their HTML markup), the region component tells its task flow to set up the context for both the task flow as a whole and for the specific sub-page that the task flow is displaying. This ensures that any references to this context in the task flow are correct while the sub-page JSF components render. When the sub-page components are finished rendering, the region component informs the task flow to revert the changes it made to the execution context, isolating the rest of the JSF page from the region.

Similarly, when delivering JSF component events to JSF components inside the region's currently displayed sub-page, the region component ensures that the task flow's context is correctly set up before delivering the event and torn down after delivering the event. In addition, since component events may result in navigation between main pages, the region component and associated logic ensures that, by default, attempts to navigate to a different main page during event delivery are prevented and instead interpreted as a request to change the currently displayed sub-page in the task flow. In one embodiment, the current JSF NavigationHandler is wrapped with a NavigationHandler that turns main page navigation into task flow navigation during event delivery to a region's children. Since the currently displayed sub-page may have changed during event delivery, the region component checks whether the currently displayed sub-page has changed after delivering each event and ensures that the region component is re-rendered with the new sub-page if the sub-page has changed.

Since in some special cases it may be desirable for a task flow to force navigation of the region's parent region or the main page, in one embodiment the region component exposes an interface through which the task flow can explicitly request that a navigation request is passed to the region's parent region or the main page if there is no including region.

FIGS. 2-6 illustrate a web page in a user interface that provides an example of adding a region to a web page in accordance with one embodiment. The example application illustrated in FIGS. 2-6 is an on-line store for purchasing movie DVDs. The user would search for the movies they wish to buy and add the ones they want to their Shopping Cart. When they are ready to complete their purchase they would be shown a sequence of sub-pages that captured their credit card, billing and shipping information to complete their purchase. This Shopping Cart and purchase checkout sequence has been refactored into a reusable set of sub-pages and task flow logic (i.e., a region) so that it can be reused across any on-line store application. For example, a developer could build an application for selling books or one for selling flowers and reuse the same Shopping Cart region that was used in the selling movie DVDs application. A developer would just have to add the Shopping Cart as a region in the page.

Figure 2:
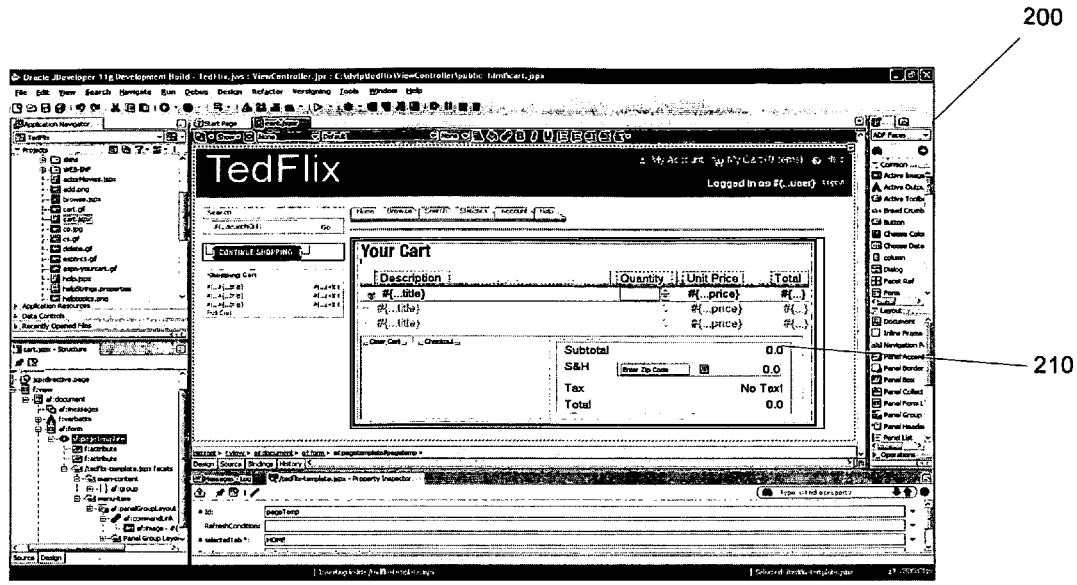
FIG. 2 illustrates a user interface and the results after an application developer drags a Shopping Cart region onto their Movie Store page.

In one embodiment, an application developer in a development environment would edit the Movie Store page where they wish to embed the Shopping Cart task flow as a region on their page. FIG. 2 illustrates a user interface 200 and the results after an application developer drags a Shopping Cart task flow onto their Movie Store page, creating region 210. Region 210 displays the first sub-page page fragment, the cart information.

Figure 3:
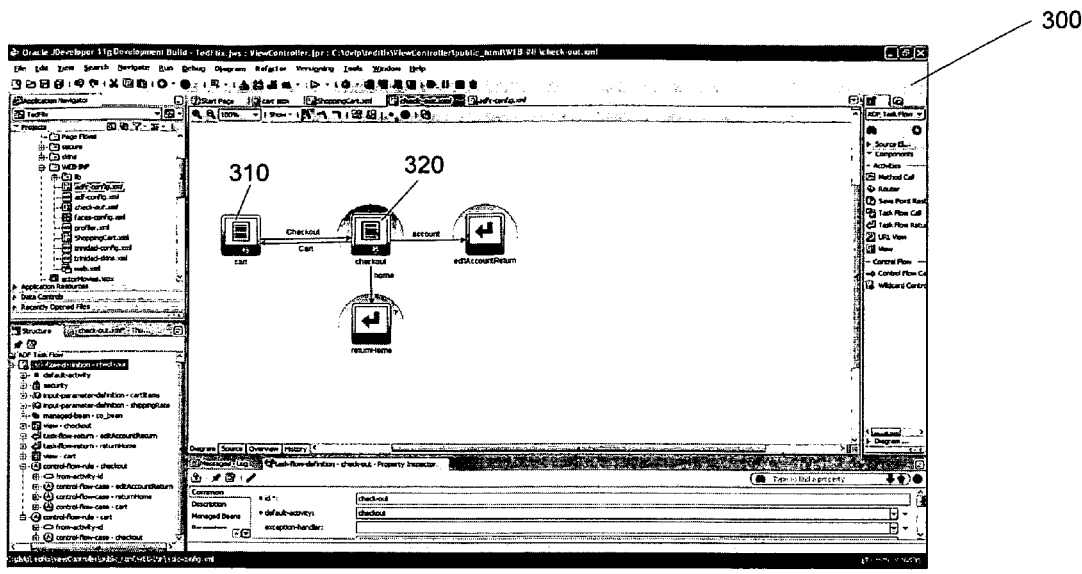
FIG. 3 is a user interface that illustrates the set of rules behind the Shopping Cart region that governs what pages the user can navigate to based on user interactions.

FIG. 3 is a user interface 300 that illustrates the set of control flow rules behind Shopping Cart region 210 governing the pages the user navigates to based on user interactions. These rules and the associated page fragment sub-pages are the Shopping Cart task flow for region 210. The Shopping Cart task flow for region 210 is relatively simple with only two pages. The first, the "cart" page 310, contains a table of the items purchased (shown in FIG. 2) and a "checkout" button. When the user clicks the "checkout" button they navigate to the second page 320, the "checkout" page.

Figure 4:
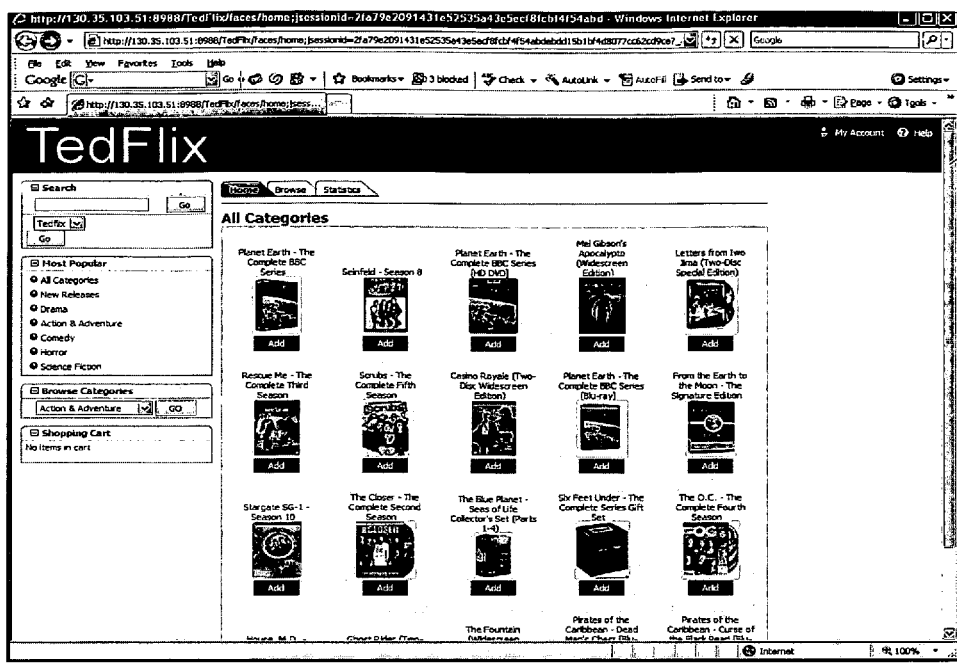
FIG. 4 illustrates a user interface with the running Movie Store application.

Once the developer has finished adding the Shopping Cart as region 210 to a page in the Movie Application, the running application can be viewed. FIG. 4 illustrates a user interface 400 with the running application. The first page of the application is where the user is able to search and place movies they wish to buy into their Shopping cart.

Figure 5:
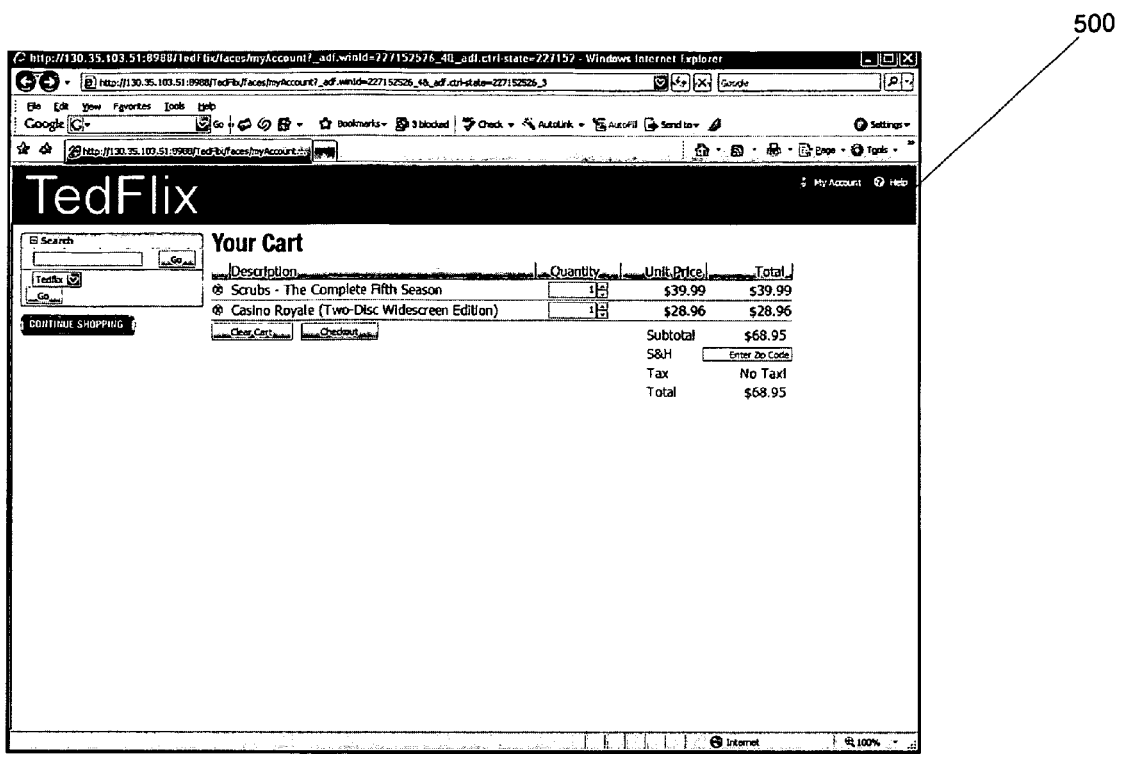
FIG. 5 illustrates a user interface with a Shopping Cart.

Once the user has made the choice of movies they wish to buy, they view their Shopping Cart, which is illustrated on FIG. 5 on user interface 500. This is what the page illustrated in FIG. 2, as it is being edited, looks like when presented to the user running in the browser.

Figure 6:
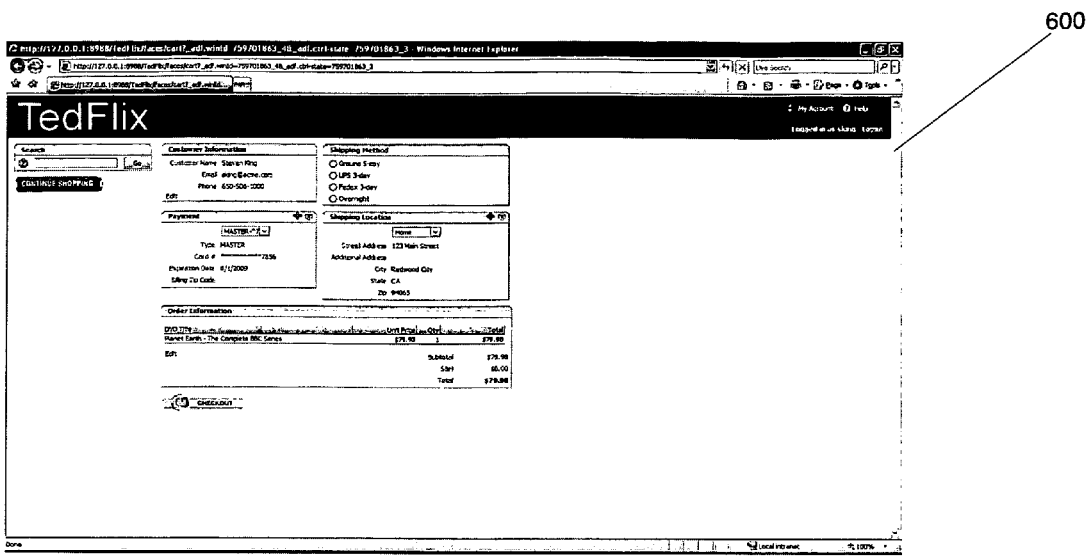
FIG. 6 illustrates a user interface with a check out page.

After the user presses the checkout button shown in FIG. 5, they are taken to the next sub-page defined by the task flow, which is the checkout sub-page illustrated in FIG. 6 as user interface 600. Here the user is prompted to enter their billing and shipping information. As shown, the main page remains the same and just the content of the region is changed to show the checkout sub-page.

Figure 7:
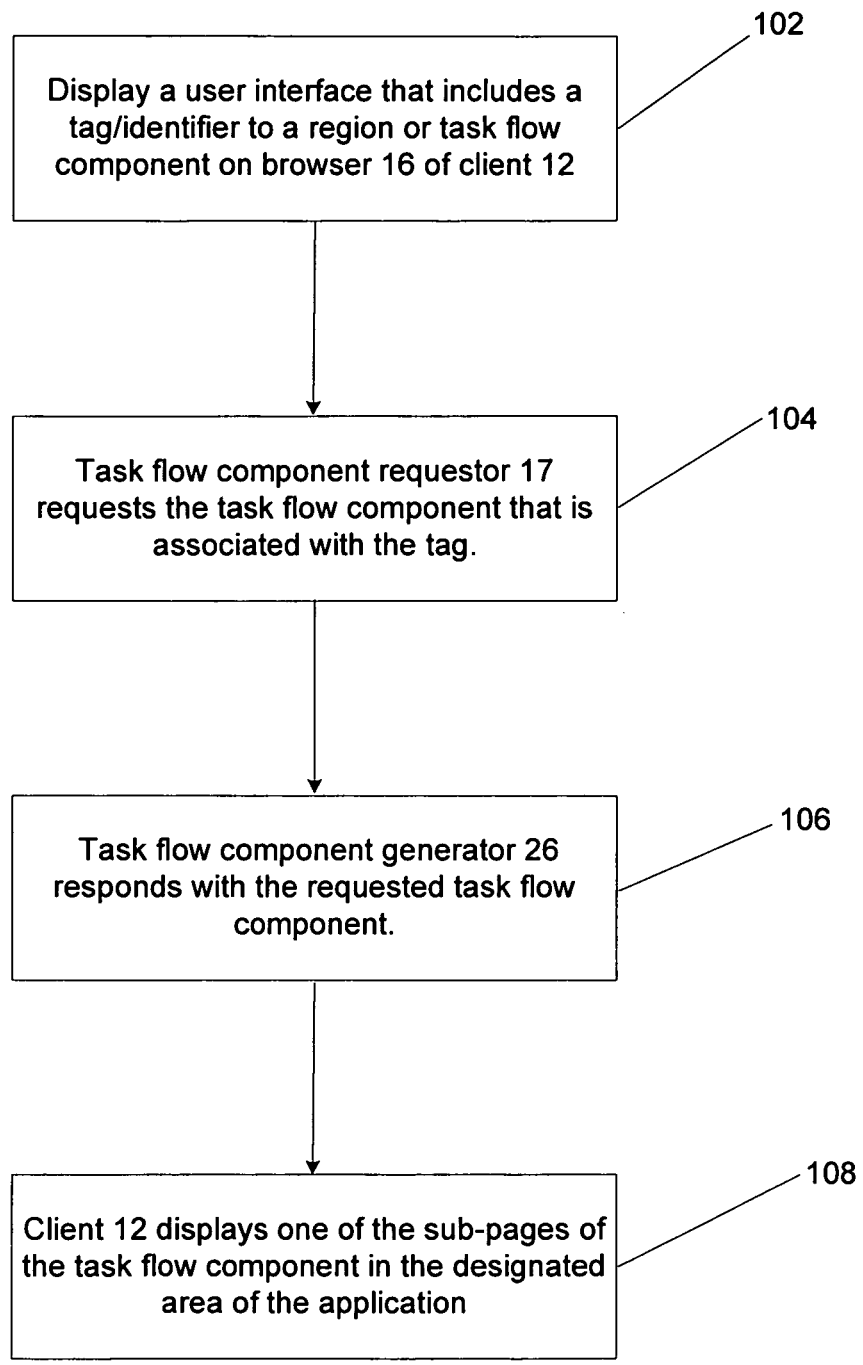
FIG. 7 is a flow diagram of the functionality of the system when a task flow component is requested from an application executing on a web browser in accordance to one embodiment.

FIG. 7 is a flow diagram of the functionality of system 10 when a task flow component is requested from an application executing on a web browser on client 12 in the form of a web page or other type of user interface in accordance with one embodiment. In one embodiment, the functionality of the flow diagram of FIG. 7 is implemented by software stored in memory or other computer readable or tangible medium, and executed by a processor. In other embodiments, the functionality can be performed by hardware, or any combination of hardware and software.

At 102, a user interface that includes a tag/identifier to a region or task flow component is displayed on an area of the user interface on browser 16 of client 12 of FIG. 1. In one embodiment, the region tag is <af:region id="<subviewID>" value="<expression language reference to task flow reference>">. In this embodiment, the tag is responsible for creating the region instance and including the content of the task flow's current JSF fragment.

At 104, task flow component requester 17 requests the task flow component that is associated with the tag. In one embodiment, the request is sent via link 20 to task flow component generator 26. In another embodiment, task flow component generator 26 may be local to task flow component requester 17.

At 106, task flow component generator 26 responds with the requested task flow component. The task flow component includes two or more web pages and the control flow for the web pages. The task flow component may be stored remote or local to client 12 or server 22.

At 108, client 12 displays one of the sub-pages of the task flow component in the designated area of the user interface application and enables the control flow so that a user can interface with the web pages of the task flow component. At this point, a user can interact with the task flow component without affecting the remainder the application web page.

As disclosed, embodiments of the present invention allow reusable task flow components to be inserted into applications so that that the functionality of the task flow components can be achieved without requiring an application developer to separately generate the functionality and the associated web pages and task flow. Further, changes to the task flow components are instantly reflected in the application using the task flow component.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A method of generating a user interface at a client computer, the method comprising:

including a plurality of region tags in a definition of the user interface, wherein each region tag corresponds to a task flow component stored on a remote server, and each task flow component comprises a plurality of sub-pages and a control flow for the sub-pages;

executing at the client computer the definition including the region tags and in response receiving the corresponding task flow components from a remote server and generating the user interface with a plurality of regions, and embedding one of the received task flow components in each of the regions; and displaying a first task flow sub-page of the plurality of sub-pages within each region of the user interface and enabling the control flow;

wherein the control flow automatically determines that the first task flow sub-page is an initial sub-page of the plurality of sub-pages to display and automatically determines, in response to a request to perform an action on a second task flow sub-page, whether navigation should occur to a third sub-page and determines the third sub-page from the plurality of sub-pages to navigate to and to display within the region that replaces the second task flow sub-page;

wherein the control flow further determines one or more parameters to pass from the second sub-page to the third sub-page upon navigation to the third sub-page;

wherein a remainder of the user interface is isolated from the region during navigation between the sub-pages;

wherein the plurality of region tags are generated by, using an editor, providing a developer of an application with a list of valid task flow components that are part of the application and each provide a predefined functionality, and allowing the developer to select one of the valid task flow components to be embedded into each region in the user interface, wherein each task flow component selected causes the corresponding region tag in the definition of the user interface to be generated, and the corresponding functionality of the plurality of sub-pages and the control flow of the selected task flow component to be executed as a region component within the region after the user interface is generated at the client computer.

2. The method of claim 1, wherein the task flow component allows a user to interact with the plurality of sub-pages without affecting a remainder of the user interface.

3. The method of claim 1, wherein the editor is a visual editor, and the select comprises dragging and dropping the task flow component onto a page.

4. The method of claim 1, wherein the control flow comprises a navigation to a main page of the task flow component.

5. The method of claim 1, wherein the task flow component comprises a task flow that is used as a sub-component of a web page.

6. The method of claim 5, wherein the web page comprises multiple task flow components, and each task flow component is self-contained and nestable.

7. The method of claim 1, wherein the user interface comprises a JAVASERVER Page (JSP), the region tag comprises a JSP region tag, and the task flow component comprises a JAVASERVER FACE (JSF) region component, and wherein all pages of the task flow component are JSF page fragments.

8. An apparatus comprising:
  a processor;
  a task flow component generator coupled to the processor of a server;
  wherein the task flow component generator is adapted to receive a request for a task flow component from a user interface and in response generate a task flow component;
  wherein the task flow component comprises a plurality of sub-pages and a control flow for the sub-pages;
  wherein the task flow component includes instructions for displaying a first task flow sub-page of the plurality of sub-pages within a region of the user interface and enabling the control flow;
  wherein the control flow automatically determines that the first task flow sub-page is an initial sub-page of the plurality of sub-pages to display and automatically determines, in response to a request to perform an action on a second task flow sub-page, whether navigation should occur to a third sub-page and determines the third sub-page from the plurality of sub-pages to navigate to and to display within the region that replaces the second task flow sub-page;
  wherein the control flow further determines one or more parameters to pass from the second sub-page to the third sub-page upon navigation to the third sub-page;
  wherein a remainder of the user interface is isolated from the region during navigation between the sub-pages;
  the request is received from a remote client computer and is in response to a plurality of included region tags in a definition of the user interface, wherein each region tag corresponds to the task flow component stored on the server, the request is generated in response to executing at the remote client computer the definition including the region tags, and the user interface is generated at the remote client computer with a plurality of regions, and embedding one of the received task flow components in each of the regions and by displaying the first task flow sub-page of the plurality of sub-pages within the region of the user interface and enabling the control flow;
  wherein the plurality of region tags are generated by, using an editor, providing a developer of an application with a list of valid task flow components that are part of the application and each provide a predefined functionality, and allowing the developer to select one of the valid task flow components to be embedded into each region in the user interface, wherein each task flow component selected causes the corresponding region tag in the definition of the user interface to be generated, and the corresponding functionality of the plurality of sub-pages and the control flow of the selected task flow component to be executed as a region component within the region after the user interface is generated at the client computer.

9. The apparatus of claim 8, wherein the user interface comprises a JAVASERVER Page (JSP), the region tag comprises a JSP region tag, and the task flow component comprises a JAVASERVER FACE (JSF) region component, and wherein all pages of the task flow component are JSF page fragments.

10. The apparatus of claim 9, wherein the task flow component comprises a task flow that is used as a sub-component of a web page.

11. The apparatus of claim 10, wherein the web page comprises multiple task flow components, and each task flow component is self-contained and nestable.

12. The apparatus of claim 8, wherein the task flow component allows a user to interact with the plurality of sub-pages without affecting a remainder of the user interface.

13. The apparatus of claim 8, wherein the editor is a visual editor, and the select comprises dragging and dropping the task flow component onto a page.

14. The apparatus of claim 8, wherein the control flow comprises a navigation to a main page of the task flow component.

15. A non-transitory computer readable medium having instructions stored thereon that, when executed by a processor, cause the processor to generate a user interface, the generating comprising:
  include a plurality of region tags in a definition of the user interface, wherein each region tag corresponds to a task flow component stored on a remote server, and each task flow component comprises a plurality of sub-pages and a control flow for the sub-pages;
  executing at the client computer the definition including the region tags and in response receive the corresponding task flow components from a remote server and generating the user interface with a plurality of regions, and embedding one of the received task flow components in each of the regions; and
  display a first task flow sub-page of the plurality of sub-pages within each region of the user interface and enabling the control flow;
  wherein the control flow automatically determines that the first task flow sub-page is an initial sub-page of the plurality of sub-pages to display and automatically determines, in response to a request to perform an action on a second task flow sub-page, whether navigation should occur to a third sub-page and determines the third sub-page from the plurality of sub-pages to navigate to and to display within the region that replaces the second task flow sub-page;
  wherein the control flow further determines one or more parameters to pass from the second sub-page to the third sub-page upon navigation to the third sub-page;
  wherein a remainder of the user interface is isolated from the region during navigation between the sub-pages;
  wherein the plurality of region tags are generated by, using an editor, providing a developer of an application with a list of valid task flow components that are part of the application and each provide a predefined functionality, and allowing the developer to select one of the valid task flow components to be embedded into each region in the user interface, wherein each task flow component selected causes the corresponding region tag in the definition of the user interface to be generated, and the corresponding functionality of the plurality of sub-pages and the control flow of the selected task flow component to be executed as a region component within the region after the user interface is generated at the client computer.

16. The computer readable medium of claim 15, wherein the task flow component allows a user to interact with the plurality of sub-pages without affecting a remainder of the user interface.

17. The computer readable medium of claim 15, wherein the task flow component comprises a task flow that is used as a sub-component of a web page.

18. The computer readable medium of claim 15, wherein the user interface comprises a JAVASERVER Page (JSP), the region tag comprises a JSP region tag, and the task flow component comprises a JAVASERVER FACE (JSF) region component, and wherein all pages of the task flow component are JSF page fragments.

19. The computer readable medium of claim 15, wherein the editor is a visual editor, and the select comprises dragging and dropping the task flow component onto a page.

* * * * *

UNITED STATES PATENT AND TRADEMARK OFFICE
CERTIFICATE OF CORRECTION

| | |
|---|---|
| PATENT NO. | : 9,208,241 B2 |
| APPLICATION NO. | : 12/044687 |
| DATED | : December 8, 2015 |
| INVENTOR(S) | : Sullivan et al. |

It is certified that error appears in the above-identified patent and that said Letters Patent is hereby corrected as shown below:

On the title page, column 2, item 56, under other publications, line 4, delete "www.wikipedia.orq." and insert -- www.wikipedia.org. --, therefor.

In the specification

In column 2, line 57, delete "Swing)" and insert -- Swing). --, therefor.

In column 4, line 17, delete "lifecycle" and insert -- lifecycle. --, therefor.

In column 6, line 14, delete "that that" and insert -- that --, therefor.

Signed and Sealed this
Twenty-third Day of August, 2016

Michelle K. Lee
*Director of the United States Patent and Trademark Office*